(12) United States Patent
Honma

(10) Patent No.: US 7,030,912 B1
(45) Date of Patent: Apr. 18, 2006

(54) IMAGE PROCESSING APPARATUS AND METHOD

(75) Inventor: Yoshihiro Honma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,269

(22) Filed: Mar. 11, 1999

(30) Foreign Application Priority Data

Mar. 11, 1998 (JP) .................................. 10/076449

(51) Int. Cl.
H04N 5/228 (2006.01)

(52) U.S. Cl. .................... 348/222.1; 348/239; 382/296

(58) Field of Classification Search ........... 348/333.12, 348/239, 231.3, 222.1, 208.6, 231.5, 580; 358/448, 450, 451, 452; 382/295–297, 298, 382/2
See application file for complete search history.

(56) References Cited

U.S. PATENT DOCUMENTS

| 4,267,555 A | * | 5/1981 | Boyd et al. .................... 345/10 |
| 5,189,404 A | * | 2/1993 | Masimo et al. .............. 345/659 |
| 5,559,554 A | * | 9/1996 | Uekane et al. ......... 348/333.02 |
| 5,850,487 A | * | 12/1998 | Takane et al. .............. 382/298 |
| 5,900,909 A | * | 5/1999 | Parulski et al. .......... 348/231.6 |
| 6,262,769 B1 | * | 7/2001 | Anderson et al. ......... 348/333.1 |
| 6,275,260 B1 | * | 8/2001 | Anderson .................... 348/239 |
| 6,343,006 B1 | * | 1/2002 | Moscovitch et al. ........ 361/681 |

* cited by examiner

Primary Examiner—David Ometz
Assistant Examiner—Yogesh Aggarwal
(74) Attorney, Agent, or Firm—Fitzpatrick, Cella, Harper & Scinto

(57) ABSTRACT

An image processor which forms a composite image of at least two images includes a storage unit which stores first and second image data, and a display unit which reads and displays the stored first and second image data in modes adapted to display forms of the first and second image data. The image processor also includes an image-signal forming unit which forms image signals representing a composite image of the stored first and second image data for display on a television monitor and a liquid crystal display panel.

8 Claims, 6 Drawing Sheets

FIG. 4

| | H1 | H2 | H3 · · · · |
|---|---|---|---|
| Y₀ | Y₀ | Y₀ | |
| U₀ | U₀ | U₀ | |
| Y₁ | Y₁ | Y₁ | |
| V₀ | V₀ | V₀ | |
| Y₂ | Y₂ | Y₂ | |
| U₂ | U₂ | U₂ | |
| Y₃ | Y₃ | Y₃ | |
| V₂ | V₂ | V₂ | |
| Y₄ | Y₄ | Y₄ | |
| U₄ | U₄ | U₄ | |
| ⋮ | ⋮ | | |

HORIZONTAL DIRECTION →

VERTICAL DIRECTION →

IMAGE PROCESSING APPARATUS AND METHOD

BACKGROUND OF THE INVENTION

1. Field of the Invention

The present invention generally relates to image processing apparatuses and methods for processing images displayed by image display apparatuses such as television monitors and liquid crystal display panels.

2. Description of the Related Art

FIG. 1 is a block diagram of a conventional video-signal processing apparatus. A charge coupled device (CCD) sensor 1a converts a captured picture into an electrical signal. An analog-to-digital (A/D) converter 2a converts an analog video signal output from the CCD sensor 1a to a digital video signal.

An image-capturing signal processing circuit 3a generates a luminance signal based on the signal output from the CCD sensor 1a by performing color carrier elimination, aperture correction, gamma processing, etc. The image-capturing signal processing circuit 3a simultaneously generates a chroma signal by performing color interpolation, matrix transformation, gamma processing, gain adjustment, etc., and outputs video signals such as a luminous signal Y, and two chroma signals U and V. A data writing circuit 4a writes the generated video signals in a volatile random access memory (VRAM) 5a.

The VRAM 5a is, for example, a dynamic random access memory (DRAM) provided with writing and reading ports, and performs addressing for each horizontal line.

A timing generating circuit 6a generates timing signals necessary for other circuits. A data reading circuit 7a reads video data stored in the VRAM 5a (see FIG. 4). Accordingly, the data writing circuit 4a stores data ($Y_0$, $U_0$; $Y_1$, $V_0$; $Y_2$, $U_2$; $Y_3$, $V_2$; ... ) at sequential memory addresses for each horizontal line in the VRAM 5a, and the data reading circuit 7a reads the data for each horizontal line at address pointers H1, H2, ..., and the data size.

A television (TV)-system signal processing circuit 8a outputs TV digital video signals by performing the signal processing (chroma encoding, band correction, composing, etc.) of the Y, U, and V signals read by the data reading circuit 7a.

Digital-to-analog (D/A) converters 9a and 9b convert the digital video signals into analog video signals. Low-pass filters (LPFs) 10a and 10b block high-frequency noise components generated when D/A conversion is performed. A gain adjustment circuit 11a adjusts video signals from the LPF 10b to have a signal level adapted for liquid crystal display.

A liquid crystal controller 12a generates driving pulses necessary for liquid crystal display, and converts TV signals from the gain adjustment circuit 11a into signals for liquid crystal display. A liquid crystal display panel 13a displays a visible image based on signals from the liquid crystal controller 12a.

A video amplifier 14a outputs video signals from through the LPF 10a at a TV-signal level and impedance. A television (TV) monitor 15a uses a color television broadcasting system such as the NTSC or PAL system to display images.

The operation of the above-described conventional video-signal processing apparatus is described below.

The picture signal from the CCD sensor 1a is converted into a digital video signal by the A/D converter 2a, and is processed by the signal processing circuit 3a to generate luminance signal Y, and chroma signals U and V. The Y signal is obtained by performing color carrier elimination, aperture correction, gamma conversion, etc. The U signal represents the chroma between blue and the Y signal, and the V signal represents the chroma between red and the Y signal. The U and V signals are obtained by performing color interpolation, matrix transformation, gamma conversion, etc. The Y, U, and V signals output from the signal processing circuit 3a are stored in the VRAM 5a by the data writing circuit 4a, in the order of $Y_0$, $U_0$; $Y_1$, $V_0$; $Y_2$, $U_2$; $Y_3$, $V_2$; ..., from the top left of an image as shown in FIG. 4.

The data stored in the VRAM 5a are read in the writing order by the data reading circuit 7a, and are processed by the TV-system signal processing circuit 8a to generate separate luminance and chroma signals, composite signals, and luminance and chroma signals for the liquid crystal display panel 13a.

The digital video signals output from the TV-system signal processing circuit 8a are converted into analog video signals by the D/A converters 9a and 9b. The analog signals are processed by the LPFs 10a and 10b so that bandwidth reduction is performed. The analog signals for the liquid crystal display panel 13a are processed by the gain adjustment circuit 11a so that level matching is performed, and is output to the liquid crystal controller 12a. At the same time, the analog signals for the TV monitor 15a are processed by the video amplifier 14a so that level matching and output impedance adjustment is performed, and are output to the TV monitor 15a.

FIG. 2 is a block diagram of another conventional video-signal processing apparatus. Blocks identical to those in the first described conventional video-signal processing apparatus are denoted by the same reference numerals to avoid duplicate descriptions.

A DRAM 21a is used for a purpose similar to that of the VRAM 5a. The DRAM 21a stores image data to be displayed on a screen by superimposing or replacing an image captured by a CCD sensor (not shown).

A captured image reading circuit 22a reads data of images captured by the CCD sensor. A superimposing image reading circuit 23a reads the image data for superimposing stored in the DRAM 21a.

A superimposing circuit 24a performs switching, superimposing, or replacement between the captured image data output from the captured image reading circuit 22a, and the superimposing image data output from the superimposing image reading circuit 23a. Outputs from the superimposing circuit 24a are input to a TV-system signal processing circuit 8a.

A description of a process from the TV-system signal processing circuit 8a to a TV monitor 15a is omitted since the process is identical to that in the first described video-signal processing apparatus.

In the above-described conventional video-signal processing apparatuses, images output to the liquid crystal display 13a and the TV monitor 15a are identical. Accordingly, in the case where image capture is performed with a camera (to which the video-signal processing apparatus is applied) or the like vertically held, a subject in a picture displayed on the TV monitor 15a is horizontal (see FIG. 6D).

Accordingly, in the conventional video-signal processing apparatuses, picture rotation is performed so that picture dimensions match the dimensions of the TV monitor 15a; in other words, when a picture is rotated 90 degrees, its size must be reduced to ¾ because the aspect ratio of the picture is 3:4.

This causes a problem when the picture is rotated and reduced in size on the liquid crystal display panel 13a, which has a smaller display area than that of the TV monitor 15a, and the subject cannot be clearly seen.

In addition, in the case where character data such as instructions for image capture are displayed on the liquid crystal display panel 13a, if characters displayed on the TV monitor 15a, and characters displayed on the liquid crystal display panel 13a have the same orientation, a problem of questionable operability occurs when the camera is vertically held because the characters on the liquid crystal display panel 13a are horizontally inclined and cannot be easily read.

SUMMARY OF THE INVENTION

Accordingly, it is an object of the present invention to provide a video-signal processing apparatus and method for solving the foregoing problems.

It is another object of the present invention to provide an image processing apparatus for enhancing the qualities of images simultaneously displayed on a television monitor and on a liquid crystal display panel.

It is a further object of the present invention to provide an image processing method for enhancing the qualities of images simultaneously displayed on a television monitor and on a liquid crystal display panel.

To these ends, according to an aspect of the present invention, the foregoing objects have been achieved through provision of an image processing apparatus for forming a composite image of at least two images, the image processing apparatus comprising: a storage unit for storing first image data and second image data; a display unit for reading the first and second image data stored in the storage unit, and displaying the read first and second image data in modes adapted for the display forms of the first and second image data; and an image-signal forming unit for forming image signals representing a composite image based on the first and second image data read from the storage unit.

According to another aspect of the present invention, the foregoing objects have been achieved through provision of an image processing method for forming a composite image of at least two images, the image processing method comprising: a storage step for storing both first image data and second image data; a display step for reading the first and second image data stored in the storage step, and displaying the read first and second image data in modes adapted for the display forms of the first and second image data; and an image-signal forming step for forming image signals representing a composite image based on the first and second image data read from the storage unit.

According to a further aspect of the present invention, the foregoing objects have been achieved through provision of an image processing apparatus for forming a composite image of at least two images, the image processing apparatus comprising: an image capture unit for performing image capture, and generating image signals corresponding to the captured image of a subject; a storage unit for storing first image data generated by the image capture unit, and second image data different from the first image data; a display unit for reading the first and second image data stored in the storage unit, and displaying the read first and second image data in modes adapted for the display forms of the first and second image data; an image-signal forming unit for reading the stored first and second image data, and forming video signals representing a composite image of a first image represented by the first image data and a second image represented by the second image data so that the first and second images are displayed on the same display screen; and an output unit for externally outputting the video signals formed by the image-signal forming unit.

Further objects, features and advantages of the present invention will become apparent from the following description of the preferred embodiments with reference to the attached drawings.

BRIEF DESCRIPTION OF THE DRAWINGS

FIG. 4 is a drawing showing the arrangement of data stored in the DRAM 31 shown in FIG. 3.

DESCRIPTION OF THE PREFERRED EMBODIMENT

A video-signal processing apparatus and method according to an embodiment of the present invention is described below.

Figure 1:
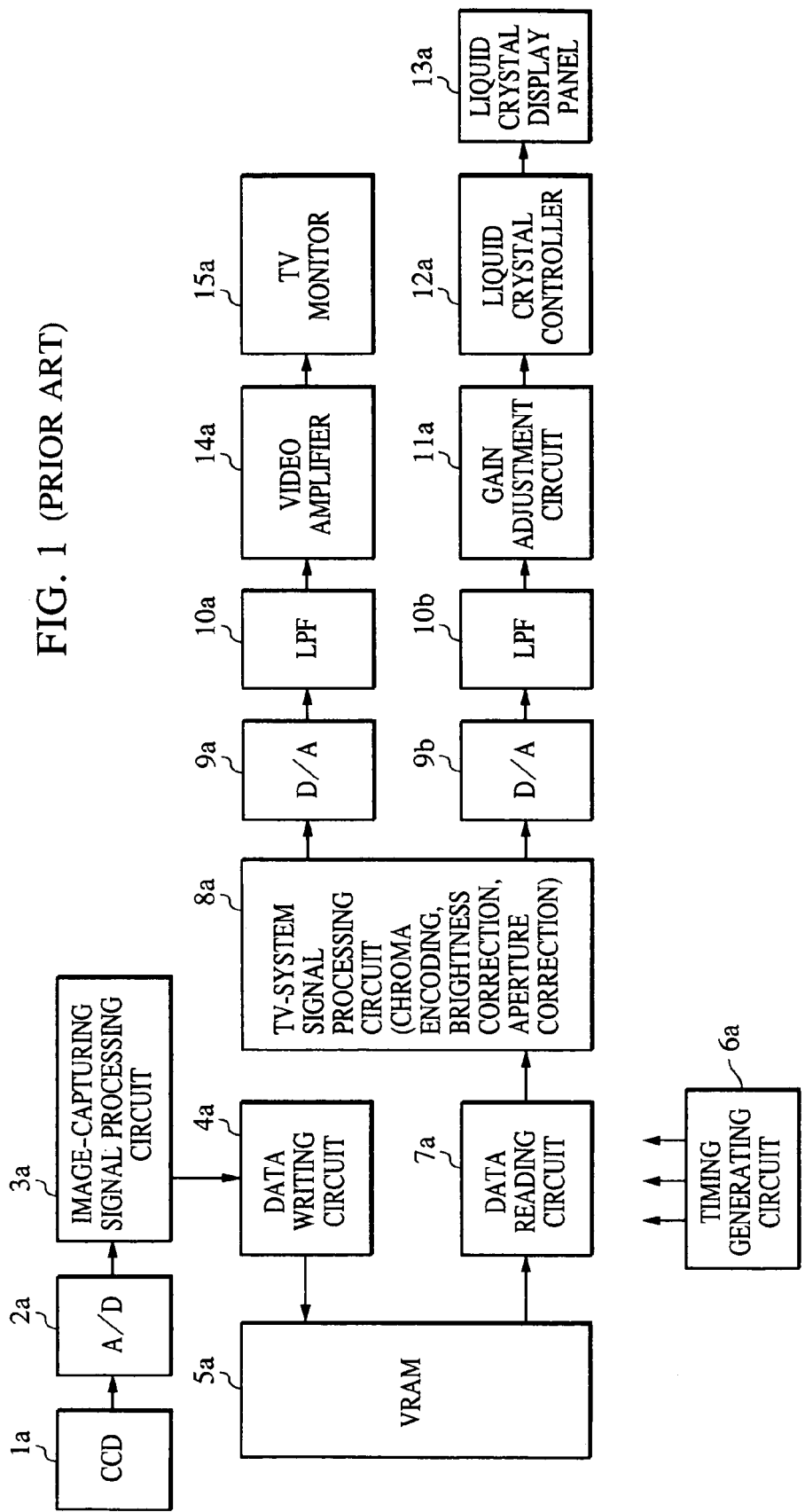
FIG. 1 is a block diagram showing a conventional video-signal processing apparatus.
Figure 2:
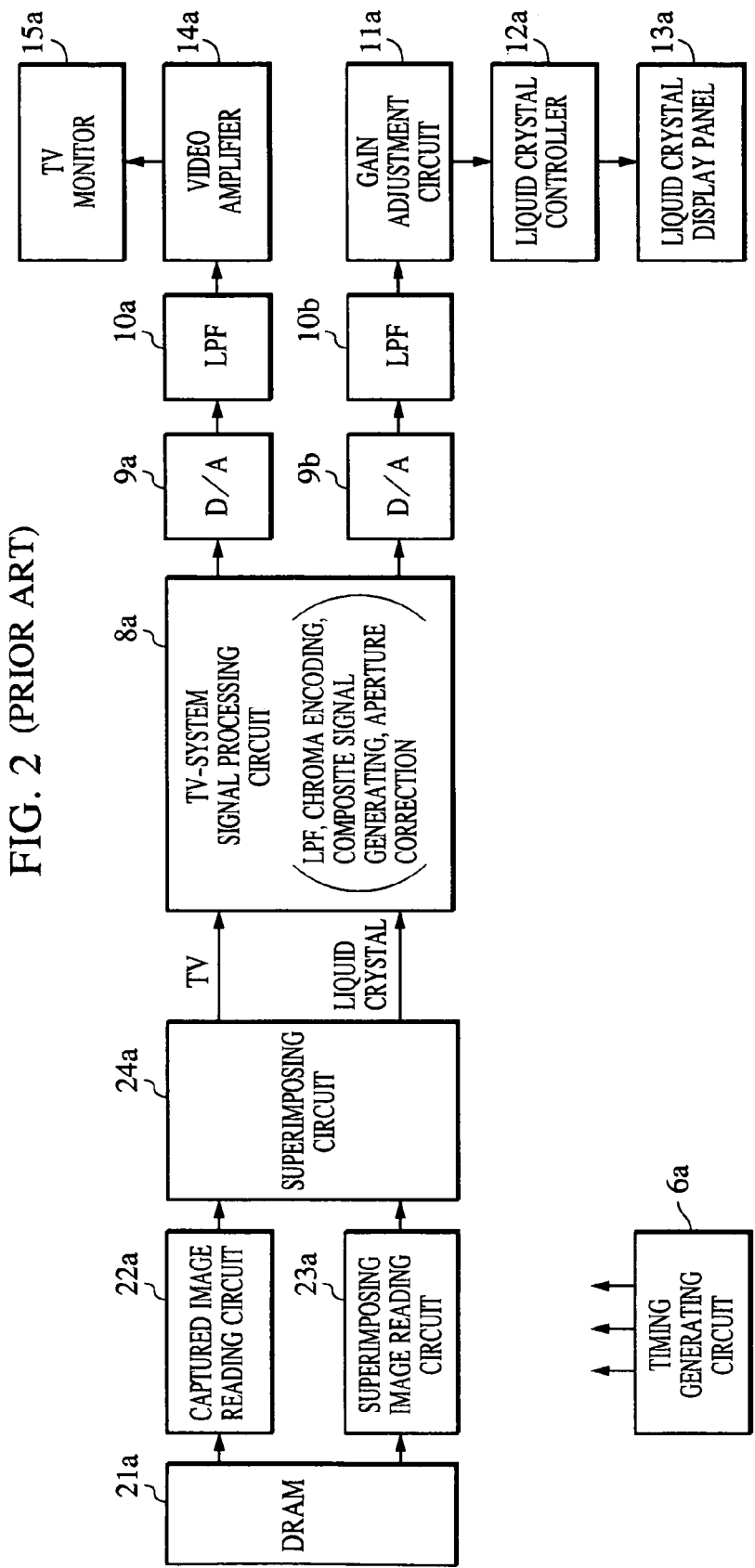
FIG. 2 is a block diagram showing another conventional video-signal processing apparatus.
Figure 3:
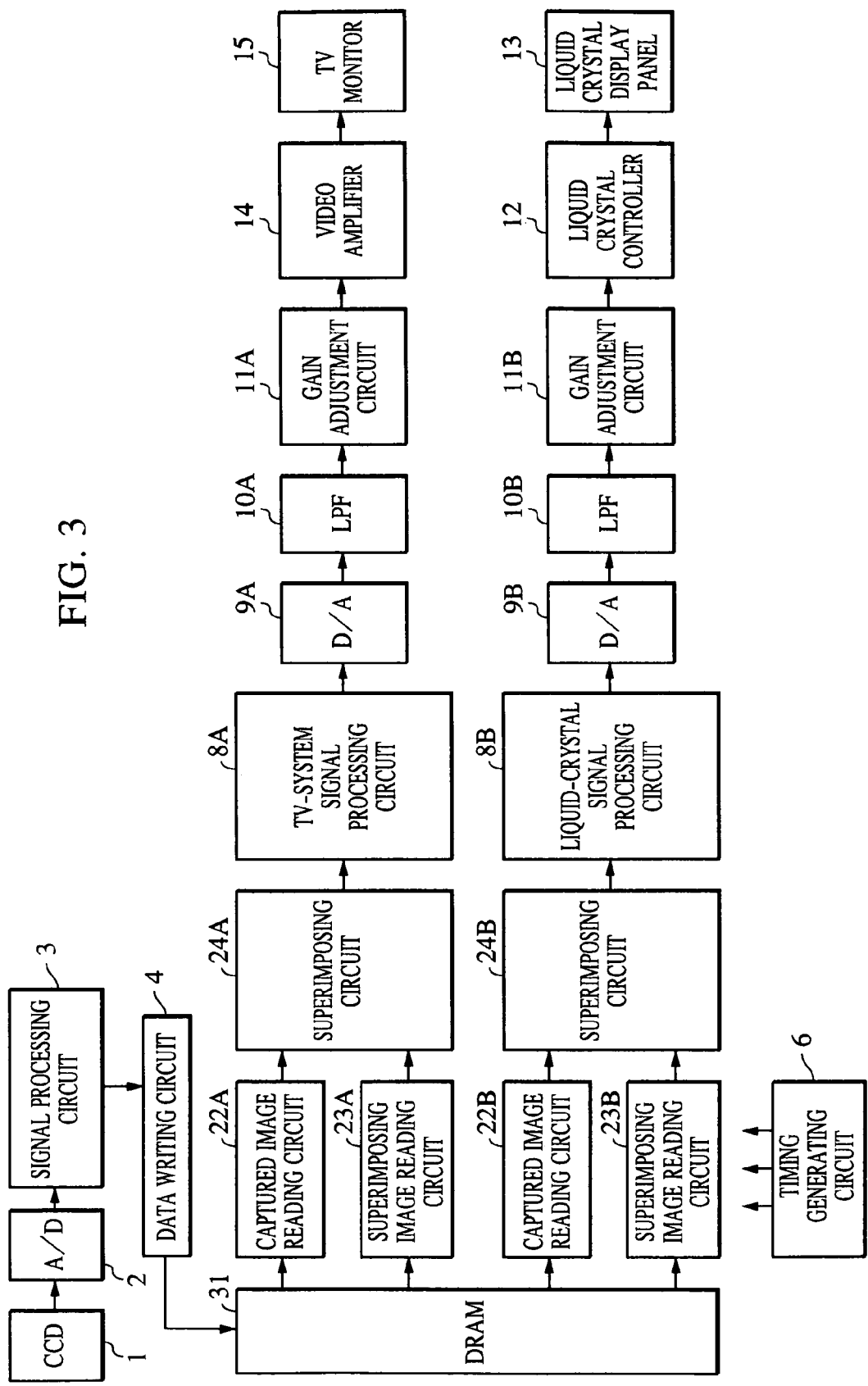
FIG. 3 is a block diagram showing a video-signal processing apparatus according to an embodiment of the present invention.

FIG. 3 is a block diagram of the video-signal processing apparatus. The video-signal processing apparatus can be applied to image capturing devices such as digital cameras. A CCD sensor 1 converts a captured picture into an electrical signal. An A/D converter 2 converts an analog video signal output from the CCD sensor 1 to a digital video signal.

An image-capturing signal processing circuit 3 generates a luminance signal based on the signal output from the CCD sensor 1 by performing color carrier elimination, aperture correction, gamma processing, etc. The image-capturing signal processing circuit 3 simultaneously generates a chroma signal by performing color interpolation, matrix transformation, gamma processing, gain adjustment, etc., and outputs video signals such as luminous signal Y, and two chroma signals U and V.

A data writing circuit 4 writes the Y, U, and V signals output from the image-capturing signal processing circuit 3, in a DRAM 31. A timing generating circuit 6 generates timing signals necessary for other circuits.

The DRAM 31 has writing and reading ports, and is, for example, a video memory that performs addressing for each horizontal line. In the DRAM 31, data of images captured by the CCD sensor 1, and data of superimposing images are stored.

Captured image reading circuits 22A and 22B read the data on images captured by the CCD sensor 1 from the DRAM 31. Superimposing image reading circuits 23A and 23B read the superimposing image data stored in the DRAM 31.

Superimposing circuits 24A and 24B perform switching, superimposing, or replacement between the captured image data from the captured image reading circuits 22A and 22B, and the superimposing image data from the superimposing image reading circuits 23A and 23B.

A TV-system signal processing circuit 8A and a liquid-crystal signal processing circuit 8B respectively output TV-monitor signals and liquid-crystal display signals by performing signal processes (such as chroma encoding, bandwidth reduction, and composing) for output signals from the superimposing circuits 24A and 24B.

D/A converters 9A and 9B convert respective digital video signals (such as composite, separate, and component signals) output from the TV-system signal processing circuit 8A and the liquid-crystal signal processing circuit 8B, to analog video signals.

LPFs 10A and 10B block high-frequency noise components existing when D/A conversion is performed. Gain adjustment circuits 11A and 11B adjust signals from the LPFs 10A and 10B to have a signal level adapted for outputting to the TV monitor 15 and the liquid crystal display panel 13. A liquid crystal controller 12 generates driving pulses necessary for liquid crystal display, and converts output signals from the gain adjustment circuit 11B to signals for displaying images on the liquid crystal display panel 13.

The liquid crystal display panel 13 is provided on a camera to which the present invention is applied, and uses a liquid crystal device to display a visible image based on output signals from the liquid crystal controller 12. A video amplifier 14 outputs signals adapted for a TV-monitor level and output impedance, to the TV monitor 15. The TV monitor 15 is provided separately from the camera, and uses a color television broadcasting system such as the NTSC or PAL system to display images.

The operation of the above-described video-signal processing apparatus is described below.

The picture signal from the CCD sensor 1 is converted to a digital video signal by the A/D converter 2, and is processed by the signal processing circuit 3 to generate luminance signal Y and chroma signals U and V. The Y signal is obtained by performing color carrier elimination, aperture correction, gamma conversion, etc. The U signal represents the chroma between blue and the Y signal, and the V signal represents the chroma between red and the Y signal. The U and V signals are obtained by performing color interpolation, matrix transformation, gamma conversion, etc. The Y, U, and V signals output from the image-capturing signal processing circuit 3 are stored in the DRAM 31 by the data writing circuit 4, in the order of $Y_0, U_0; Y_1, V_0; Y_2, U_2; Y_3, V_2; \ldots$, from the top left of the screen as shown in FIG. 4, which also shows the arrangement of data stored in the DRAM 31.

The superimposing circuit 24A and 24B output signals to the TV-system signal processing circuit 8A and the liquid-crystal signal processing circuit 8B by performing switching, superimposing, and replacement between each captured image data read from the DRAM 31 by the captured image reading circuit 22A and 22B, and each superimposing image data read from the DRAM 31 by the superimposing image reading circuit 23A and 23B.

The TV-system signal processing circuit 8A processes output signals from the superimposing circuit 24A to generate separate luminance and chroma signals, and composite signals. The liquid-crystal signal processing circuit 8B processes output signals from the superimposing circuit 24B to generate luminance and chroma signals. The digital video signals output from the TV-system signal processing circuit 8A and the liquid-crystal signal processing circuit 8B are converted into analog video signals by the D/A converters 9A and 9B. The analog video signals are processed by the LPFs 10A and 10B so that bandwidth reduction is performed. The analog video signals for the liquid crystal display panel 13 are processed by the gain adjustment circuit 11A, so that level matching is performed, and is output to the liquid crystal controller 12. At the same time, the analog video signals for television display are processed by the gain adjustment circuit 11A and the video amplifier 14A, so that level matching and output impedance adjustment is performed, and are output to the TV monitor 15.

Compared with conventional video-signal processing apparatuses, the video-signal processing apparatus according to this embodiment has the following two features:

One feature is that each function is separated to form a system for TV-monitor display and another for liquid crystal display. In each system, separate signal processing is performed.

Another feature is that techniques for reading data from the DRAM 31 can be selected. FIGS. 5A to 5D show four techniques for reading data from the DRAM 31. One technique can be selected from among the technique (shown in FIG. 5A) for sequentially reading data from the top left to the right of the image line by line, the technique (shown in FIG. 5B) for sequentially reading data from the bottom left to the top of the image, the technique (shown in FIG. 5C) for sequentially reading data from the top right to the bottom of the image, and the technique (shown in FIG. 5D) for reading data from the bottom right to the left of the image. Specifically, image data in the DRAM 31 may be read at arbitrary positions, and when image data are written in the DRAM 31, the image data may be written beforehand at positions obtained when the image data are rotated.

Figure 5A:
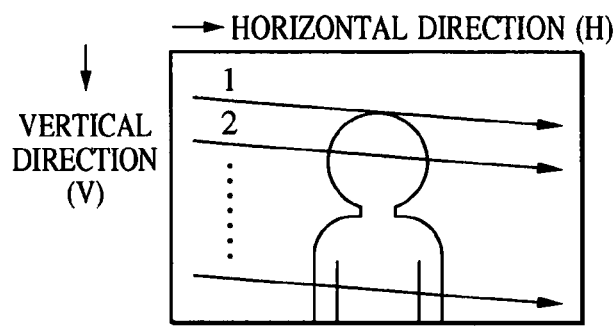
FIGS. 5A to 5D are drawings showing four techniques for reading data from the DRAM 31 shown in FIG. 3.
Figure 5B:
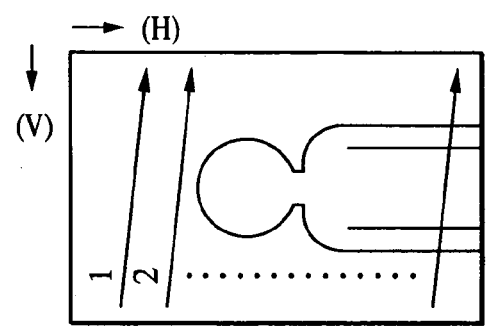
Figure 5C:
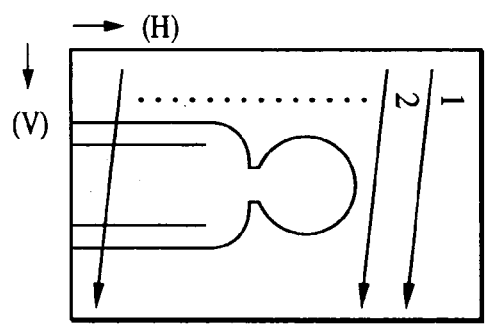
Figure 5D:
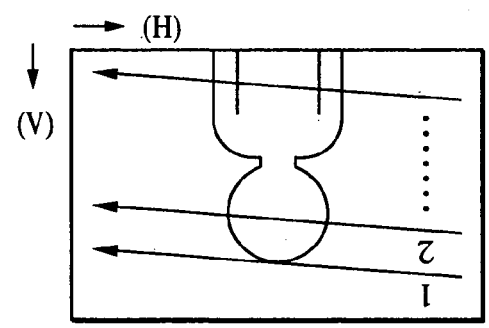

FIG. 5A shows normal image capture with the camera horizontally held. FIG. 5B shows image capture with the camera inclined 90 degrees to the right. FIG. 5C shows image capture with the camera inclined 90 degrees to the left. FIG. 5D shows image capture with the camera inverted for self-image capturing.

The reading of image data obtained by performing image capture in various directions with an image capturing device such as a digital camera is described.

In the case where images are captured at various camera positions, and the images are displayed on the liquid crystal display panel 13 provided on the camera, as shown in FIG. 5A, the sequential reading of image data is always performed from the top left to the right of the image line by line. This is because the subject is always displayed in its original orientation since the liquid crystal display panel 13 is inclined in the same direction as the CCD sensor 1.

In contrast, since the TV monitor 15 cannot be rotated, together with the camera, if the reading of image data is similarly performed, the subject image is horizontal as shown in FIGS. 5B and 5C, and is inverted as shown in FIG. 5D. Accordingly, the image must be rotated so that the subject is displayed in its original orientation by changing the technique for reading image data from the DRAM 31.

In the case where image capture is performed with the camera inclined 90 degrees to the right, by performing the sequential reading of image data from the bottom left to the top of the image, as shown in FIG. 5B, the subject is displayed in its original orientation on the TV monitor 15. Similarly, in the case where image capture is performed with the camera inclined 90 degrees to the left, by performing the sequential reading of image data from the top right to the bottom of the image, as shown in FIG. 5C, the subject is displayed in its original orientation on the TV monitor 15. In the case where image capture is performed with the camera inverted for self-image capturing, by performing the sequential reading of image data from the bottom right to the left, as shown in FIG. 5D, the subject is displayed in its original orientation on the TV monitor 15.

In addition, when an image is displayed on the TV monitor 15, the superimposing image reading circuit 23A only needs to always read the image line by line from the top left to the right of the image. Conversely, the liquid crystal display panel 13 may need to display an image in accordance with the image capture position.

Figure 6A:
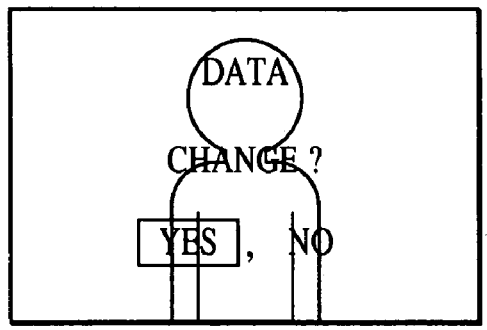
FIGS. 6A to 6D are views showing captured images and character data displayed on display screens.
Figure 6B:
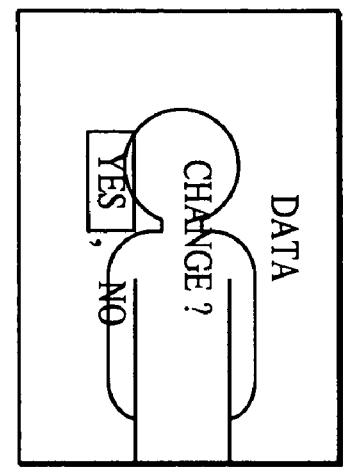
Figure 6C:
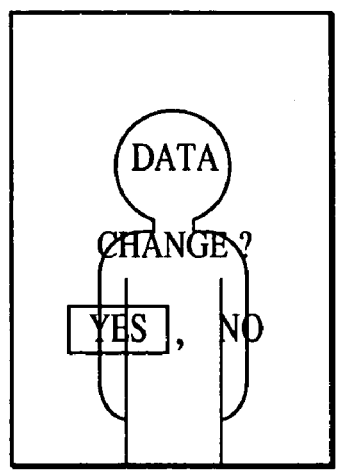
Figure 6D:
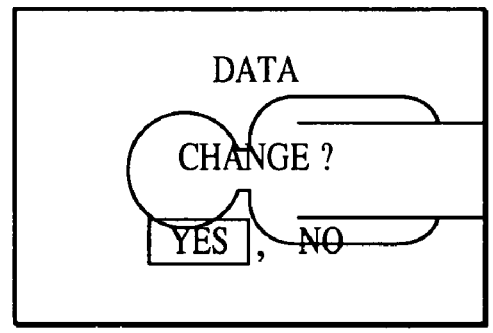

FIGS. 6A to 6D show captured images and character data. FIG. 6A shows a captured image and character data displayed on the TV monitor 15 and the liquid crystal display panel 13 when image capture is performed with the camera held at the normal position. FIG. 6B shows a captured image and character data displayed on the liquid crystal display panel 13 when image capture is performed with the camera 90 degrees inclined. FIG. 6C shows an image and superimposing image data (character data) rotated to matching the image capture direction in FIG. 6B. FIG. 6D shows an image and character data displayed on the TV monitor 15 when image capture is performed with the camera inclined 90 degrees to the right.

In the case where the superimposing image data is always displayed on the liquid crystal display panel 13 in a specific direction, irrespective of the direction of the CCD sensor 1, and image capture is performed with the camera vertically held, the displayed superimposing image data is 90 degrees inclined as shown in FIG. 6B.

Accordingly, by displaying the superimposing image data when image capture is performed with the camera vertically held as shown in FIG. 6C, the characters "DATA CHANGE? YES, NO" can clearly be seen, which increases operability. In this case, a technique for reading data from the DRAM 31 may be selected, similarly to the case of the captured image reading circuit 22A, from among the four techniques of: (1) sequentially reading data line by line from top left to the right of the image; (2) sequentially reading data from the bottom left to the top of the image; (3) sequentially reading data from the top right to the bottom of the image; and (4) sequentially reading data from the bottom right to the left of the image.

By detecting with a gravity sensor the camera position condition, and setting the camera position condition in accordance with an image capture situation, optimal display forms for the TV monitor 15 and the liquid crystal display panel 13 can be selected, so that corresponding data reading is performed. In the optimal display forms, a captured image and superimposing data can be viewed in their original orientation on the TV monitor 15 and the liquid crystal display panel 13.

As described above, by providing a memory (e.g., the DRAM 31 in this embodiment) for temporarily storing captured image data and superimposing image data, circuits (e.g., the captured image reading circuits 22A and 22B, and the superimposing image reading circuits 23A and 23B in this embodiment) for separately reading captured image data and superimposing image data from the memory, and separate output circuits for displaying images on the liquid crystal display panel 13 and the TV monitor 15; and changing a technique for reading data from the memory in accordance with a camera position condition such as image capture with a camera vertically positioned; the captured image and the superimposing image can be displayed in their original orientations without making a strange impression on viewers.

In the foregoing embodiment, image output apparatuses are a TV monitor 15 and a liquid crystal display panel 13. However, the image output apparatuses may be CRT displays, which are often used as TV monitors; plasma displays; and electroluminescence displays.

In the foregoing embodiment, image capture is performed with the camera inclined in units of 90 degrees. However, the present invention can be applied to the case where image capture is performed with the camera in units of 45 degrees.

According to the present invention, the qualities of images simultaneously displayed on display means such as the TV monitor 15 and the liquid crystal display panel 13 can be enhanced. By way of example, when image capture is performed with the camera vertically held, the captured image is displayed in its original orientation on the TV monitor 15 without being sideways, and the capture image is clearly displayed on the liquid crystal display panel 13 since the captured image is not rotated and the size of a subject is not reduced. Accordingly, the image is not reduced in size and rotated, whereby it is avoided that the image cannot be clearly viewed.

According to the present invention, in the case where character data such as an instruction concerning image capture is displayed on the liquid crystal display panel 13, when the camera is vertically held, the characters are displayed without being rotated so as to match the orientation of the TV monitor 15, and the characters are rotated and displayed on the liquid crystal display panel 13 so that the characters can be displayed so as to match the orientation of the liquid crystal display panel 13 inclined similarly to the camera. Therefore, images displayed on the TV monitor 15 and on the liquid crystal display panel 13 are clearly read, which improves operability.

According to the present invention, captured images are displayed on a plurality of display means (such as the TV monitor 15 and the liquid crystal display panel 13) in display forms adapted for the display means.

According to the present invention, by selecting a technique for reading stored image data from among the four techniques of: (1) sequentially reading data line by line from top left to the right of the image; (2) sequentially reading data from the bottom left to the top of the image; (3) sequentially reading data from the top right to the bottom of the image; and (4) sequentially reading data from the bottom right to the left of the image, a captured image can be displayed in its original orientation.

According to the present invention, when a superimposing image is displayed, together with an image captured at an inclined image-capture position, the images can be displayed in their original orientations on the same screen.

According to the present invention, when image capture is performed at an image-capture position inclined 90 degrees to the right, a subject in the captured image is displayed in its original orientation on the TV monitor 15 by sequentially reading stored image data from the bottom left to the top of the image. When image capture is performed at an image-capture position inclined 90 degrees to the left, the subject is displayed in its original orientation on the TV monitor 15 by sequentially reading stored image data from the top right to the bottom of the image. When image capture is performed at an inverted image-capture position, the subject is displayed in its original orientation on the TV monitor 15 by sequentially reading stored image data from the bottom right to the left.

The invention claimed is:

1. An image processing apparatus comprising:
   an image capture unit;
   a memory adapted to store a first image captured by said image capture unit;
   a first superimposing unit adapted to superimpose a second image on the first image read from said memory;

a second superimposing unit adapted to superimpose a third image on the first image read from said memory;
a display unit adapted to display the first image, on which the second image is superimposed; and
an outputting unit adapted to output the first image, on which the third image is superimposed, from said image processing apparatus,
wherein, when capturing an image, said image processing apparatus rotates the second image in a first direction according to a position of said image capture unit, superimposes the rotated second image on the first image, and displays the first image, on which the rotated second image is superimposed, on said display unit, and, at the same time, rotates the first image in a direction opposite to the first direction, superimposes the third image without rotation on the rotated first image, and outputs the rotated first image, on which the third image is superimposed without rotation, from said outputting unit.

2. The image processing apparatus according to claim 1, wherein the second image comprises the same image data as the third image.

3. A digital camera comprising:
an image capture unit;
a memory adapted to store a first image captured by said image capture unit;
a first superimposing unit adapted to superimpose a second image on the first image read from said memory;
a second superimposing unit adapted to superimpose a third image on the first image read from said memory;
a display unit adapted to display the first image, on which the second image is superimposed; and
an outputting unit adapted to output the first image, on which the third image is superimposed, from said digital camera,
wherein, when capturing an image, said digital camera rotates the second image in a first direction according to a position of said image capture unit, superimposes the rotated second image on the first image, and displays the first image, on which the rotated second image is superimposed, on said display unit, and, at the same time, rotates the first image in a direction opposite to the first direction, superimposes the third image without rotation on the rotated first image, and outputs the rotated first image, on which the third image is superimposed without rotation, from said outputting unit.

4. The digital camera according to claim 3, wherein the second image comprises the same image data as the third image.

5. A method for use in an image processing apparatus including an image capture unit, a memory adapted to store a first image captured by the image capture unit, a display unit adapted to display the first image, and an outputting unit adapted to output the first image from the image processing apparatus, the method comprising:
a first rotating step of rotating a second image in a first direction according to a position of the image capture unit;
a first superimposing step of superimposing the rotated second image on the first image read from the memory;
a displaying step of displaying the first image, on which the rotated second image is superimposed, using the display unit;
a second rotating step of rotating the first image in a direction opposite to the first direction;
a second superimposing step of superimposing a third image without rotation on the rotated first image read from the memory;
an outputting step of outputting the rotated first image, on which the third image is superimposed without rotation, from the image processing apparatus,
wherein, when capturing an image, said display step and said outputting step are performed at the same time.

6. The method according to claim 5, wherein the second image comprises the same image data as the third image.

7. A method for use in a digital camera including an image capture unit, a memory adapted to store a first image captured by the image capture unit, a display unit adapted to display the first image, and an outputting unit adapted to output the first image from the digital camera, the method comprising:
a first rotating step of rotating a second image in a first direction according to a position of the image capture unit;
a first superimposing step of superimposing the rotated second image on the first image read from the memory;
a displaying step of displaying the first image, on which the rotated second image is superimposed, using the display unit;
a second rotating step of rotating the first image in a direction opposite to the first direction;
a second superimposing step of superimposing a third image without rotation on the rotated first image read from the memory;
an outputting step of outputting the rotated first image, on which the third image is superimposed without rotation, from the digital camera,
wherein, when capturing an image, said display step and said outputting step are performed at the same time.

8. The method according to claim 7, wherein the second image comprises the same image data as the third image.

* * * * *

UNITED STATES PATENT AND TRADEMARK OFFICE
CERTIFICATE OF CORRECTION

PATENT NO.         : 7,030,912 B1                                       Page 1 of 1
APPLICATION NO. : 09/266269
DATED              : April 18, 2006
INVENTOR(S)        : Yoshihiro Honma It is certified that error appears in the above-identified patent and that said Letters Patent is hereby corrected as shown below:

[30] FOREIGN APPLICATION PRIORITY DATA:

"Mar. 11, 1998 (JP) 10/076449" should read --Mar. 11, 1998 (JP) 10-076449--.

Signed and Sealed this

Fifth Day of December, 2006

JON W. DUDAS
*Director of the United States Patent and Trademark Office*